United States Patent [19]

Rambosek et al.

[11] Patent Number: 5,400,981
[45] Date of Patent: Mar. 28, 1995

[54] SINGLE REEL CARTRIDGE REEL WITH WELD DESIGN

[75] Inventors: G. Phillip Rambosek, Shafer; Donald L. Pochardt, Denmark Township, Washington County, both of Minn.; John W. Louks, North Hudson, Wis.

[73] Assignee: Minnesota Mining and Manufacturing Company, St. Paul, Minn.

[21] Appl. No.: 286,985

[22] Filed: Aug. 8, 1994

Related U.S. Application Data

[63] Continuation of Ser. No. 74,068, Jun. 8, 1993, abandoned.

[51] Int. Cl.⁶ .............................. G11B 23/107
[52] U.S. Cl. .................... 242/348; 242/608.8; 242/118.6
[58] Field of Search ............. 242/197, 71.8, 118.6, 242/118.61, 68.5, 348, 341, 608.8, 609.4, 608.2; 156/71.1; 264/23

[56] References Cited

U.S. PATENT DOCUMENTS

| | | |
|---|---|---|
| 4,088,278 | 5/1978 | Adair ..................... 242/71.8 |
| 4,211,588 | 7/1980 | Raines ..................... 156/73.1 |
| 4,715,558 | 12/1987 | Fair et al. .................. 242/199 |
| 4,723,731 | 2/1988 | Posso ..................... 242/197 |
| 5,007,596 | 4/1991 | Iwahashi .................. 242/71.8 |
| 5,074,487 | 12/1991 | Okamura et al. ............ 242/71.8 |
| 5,318,239 | 6/1994 | Posso ..................... 242/71.8 |

FOREIGN PATENT DOCUMENTS

2679691  1/1993  France .
516994   2/1955  Italy ..................... 242/118.6

Primary Examiner—Daniel P. Stodola
Assistant Examiner—John Q. Nguyen
Attorney, Agent, or Firm—Gary L. Griswold; Walter N. Kirn; Charles D. Levine

[57] ABSTRACT

A tape reel includes a cylindrical hub having a cylindrical tape winding surface, an upper flange and a lower flange. A cylindrical mounting portion is formed on the inner opening of the upper flange and has a free end portion and a hub receiving portion on the outer surface. The free end portion is located closer to the free end of the mounting portion and is thinner than the hub receiving portion. The hub has a free end on which the upper flange is mounted. The inner surface of the hub includes a main portion and a flange receiving portion located closer to the free end than the main portion. The flange receiving portion is thinner than the main portion. The hub receiving portion is received in the flange receiving portion when the upper flange is mounted on the hub. The hub inner surface also includes a flash receiving portion located closer to the free end than the flange receiving portion. The flash receiving portion is thinner than the flange receiving portion.

17 Claims, 4 Drawing Sheets

SINGLE REEL CARTRIDGE REEL WITH WELD DESIGN

This is a continuation of application Ser. No. 08/074,068, filed Jun. 8, 1993, now abandoned.

TECHNICAL FIELD

The present invention relates to tape reels. More particularly, the present invention relates to tape reels for use in single reel cartridges.

BACKGROUND OF THE INVENTION

Single reel data tape cartridges, one generation of which is known as 3480 type cartridges, include a reel containing magnetic tape with a leader block attached to the free end of the tape as it extends from the reel. The cartridge is generally rectangular except for one corner which is angled and includes a leader block window. The leader block window holds the leader block and permits the tape to exit from the cartridge for threading through a tape drive when the leader block is removed. When the leader block is snapped into the window, the window is covered.

The leader block is generally rectangular and has a cutout which combines with a pin to hold the tape. The front surface of the leader block includes a slot for engaging an automatic threading apparatus in a reel-to-reel magnetic tape drive apparatus. The front surface of the leader block is generally cylindrical and has a rounded boss which engages with an inclined surface of the corner of the cartridge. The rear surface is rounded to form a portion of an arc of a radius to match the periphery of the take-up reel hub in the tape drive apparatus as the leader block fits into the slot in the hub. A compliant section may be formed on the leader block to permit the leader block to compress at its rear surface to accommodate especially the first layer of tape when the tape is wound onto the take-up reel.

The tape drive apparatus includes a threading apparatus for connection to a single reel tape cartridge. The drive apparatus includes a drive motor for the supply reel mounted beneath a base plate so that its shaft extends normal to and slightly above a surface of the base plate. A take-up reel is mounted on the base plate and is attached to the motor. The cartridge reel, when coupled to the motor, lies in substantially the same plane as a hub of the take-up reel so that the tape moves in a plane normal to both motor shafts when being transported. After the threading of the tape, transfer of the tape between the supply reel and the take-up reel is achieved by controlling the driving motors for the reels. The tape passes through a vacuum guide, a magnetic transducer head, and a tension transducer.

Known tape reels for single reel cartridges are used with half inch tape which has a nominal width of 1.265 cm (0.498 in). These reels typically have a cylindrical hub and a flange located on each axial end of the hub. The hub includes a cylindrical tape winding surface which extends between the two ends. The hub and lower flange are typically molded as a single piece and the upper flange is welded onto the hub, generally using sonic welding to create the weld. A collapsing weld joint is used and is located between the top surface of the hub and the bottom surface of the upper flange. Spacing of the upper flange with respect to the hub datum (the pitch line of the hub teeth) varies and the amount of wobble in the upper flange varies depending on the amount that the weld bead collapses and the uniformity of collapse during welding. While these variations are within acceptable limits, there is a need for a weld design which produces a more uniform spacing between the flanges and less wobble variation.

SUMMARY OF THE INVENTION

A reel for a single reel data tape cartridge according to the present invention includes a cylindrical hub, an upper flange located on one axial end of the hub, and a lower flange mounted on the other axial end of the hub. The upper flange has an inner opening. A cylindrical mounting portion is formed on the inner opening and has an outer surface. The mounting portion outer surface includes a free end portion and a hub receiving portion. The free end portion is located closer to the free end of the mounting portion and is thinner than the hub receiving portion. The upper flange also includes a ring formed on the inner surface of the upper flange mounting portion. The ring increases the rigidity of the assembled reel and reduces hub collapse.

The hub has a free end on which the upper flange is mounted. The lower flange is located on the other end of the hub. The hub has a substantially cylindrical tape winding surface around which tape is wound to form a tape pack and an inner surface. The inner surface includes a main portion and a flange receiving portion located closer to the free end than the main portion. The flange receiving portion is thinner than the main portion. The hub receiving portion of the upper flange mounting portion is received in the flange receiving portion of the hub when the upper flange is mounted on the hub. The upper flange is mounted to the hub using a shear weld.

The hub inner surface also includes a flash receiving portion located closer to the free end than the flange receiving portion. The flash receiving portion is thinner than the flange receiving portion. When the upper flange is mounted on the hub, the upper flange and the upper flange mounting portion close the flash receiving portion of the hub to contain flash from the welding process and prevent flash from escaping onto the tape winding surface. Also, the interface between the upper flange and the hub provides a tortuous path for the flash to travel.

DETAILED DESCRIPTION OF PREFERRED EMBODIMENTS

Figure 1:
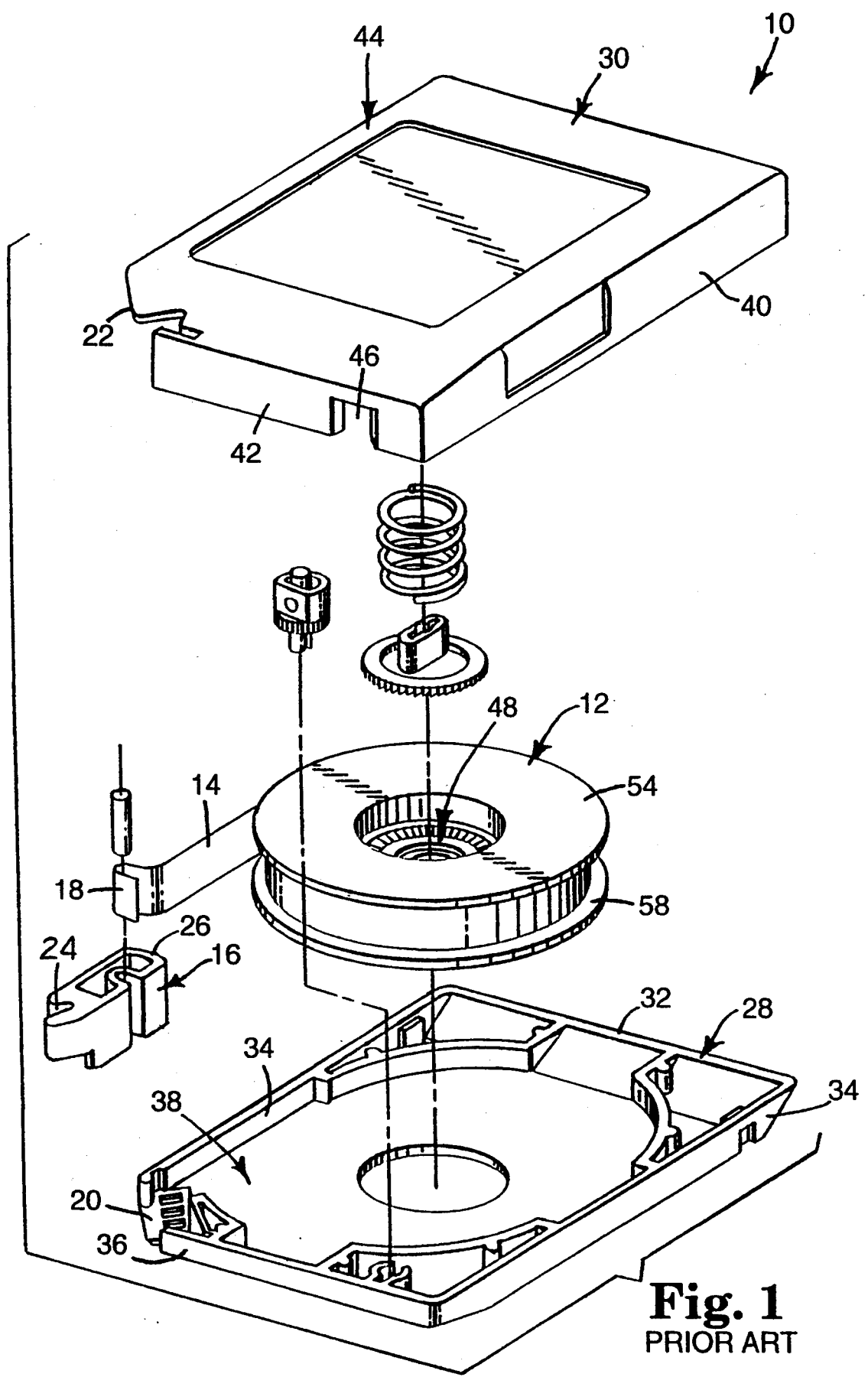
FIG. 1 is an exploded perspective view of a single reel tape cartridge having a tape reel of the present invention.

A single reel data tape cartridge 10, such as a 3480 type tape cartridge shown in FIG. 1, includes a tape reel 12 containing magnetic tape 14 with a leader block 16 attached to the free end 18 of the tape 14 as it extends from the reel 12. The cartridge 10 is generally rectangular except for one corner 20 which is angled and includes a leader block window 22. The leader block window 22 holds the leader block 16 and is an opening for the tape 14 to exit from the cartridge 10 for threading through a tape drive when the leader block 16 is removed. When the leader block 16 is snapped into the window 22, the window 22 is covered.

The front surface of the leader block 16 includes a slot 24 for engaging an automatic threading apparatus of a reel-to-reel magnetic tape drive apparatus and engages an inclined surface of the corner of the cartridge. The rear surface is rounded 26 to form a portion of an arc of a radius to match the periphery of the take-up reel hub in the tape drive apparatus as the leader block 16 fits into the slot in the hub. A compliant section may be formed on the leader block 16 to permit the leader block 16 to compress at its rear surface to accommodate especially the first layer of tape 14 when the tape 14 is wound onto the reel 12.

The cartridge 10 is formed of a base 28 and a cover 30 which combine to form a housing. The base 28 includes a rear wall 32, two opposing side walls 34, a front wall 36, and a lower wall 38 connecting the rear, front, and side walls. The cover 30 includes a rear wall, two opposing side walls 40, a front wall 42, and an upper wall 44 connecting the rear, front, and side walls. The lower wall 38 and the upper wall 44 are the major walls of the housing.

The tape drive apparatus includes a mechanism which interacts with the tape cartridge 10 to sense whether the tape 14 can be erased and recorded over or whether the tape is write-protected. The front wall 36, 42 of the cartridge has a record opening 46 which is interactable with the cartridge drive system. An erasure preventing device is locatable in the record opening 46. When the erasure preventing device blocks the record opening 46, the tape 14 can be erased. When the erasure preventing device unblocks the record opening 46, the tape drive apparatus mechanism disables the recording function to prevent accidental erasure and the tape 14 cannot be erased.

Figure 3:
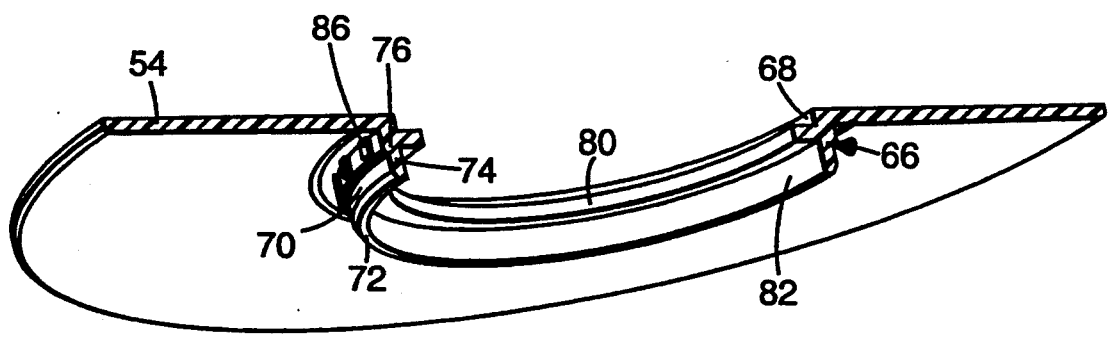
FIG. 3 is a cutaway perspective view of the flange of the reel of FIG. 1.

The tape reel 12 includes a hollow cylindrical hub 48 having an outer surface which serves as a cylindrical tape winding surface 50 and an inner surface 52. An upper flange 54 is mounted on the free axial end 56 of the hub 48, and a lower flange 58 is formed on the other axial end of the hub. The lower flange 58 and the hub 48 typically are integrally molded as one piece. The upper flange 54 is formed separately and typically is welded to the hub 48. Rather than using the collapsing weld beads as in known tape reels, the present invention uses a novel wall construction with an internal step in the interface between the upper flange 54 and the hub 48. This configuration permits using a shear weld that can include a continuous weld joint or a segmented weld joint 86 as shown in FIG. 3. Segmenting the weld joint reduces energy requirements and reduces distortion on the tape upper flange 54 during welding.

Figure 4:
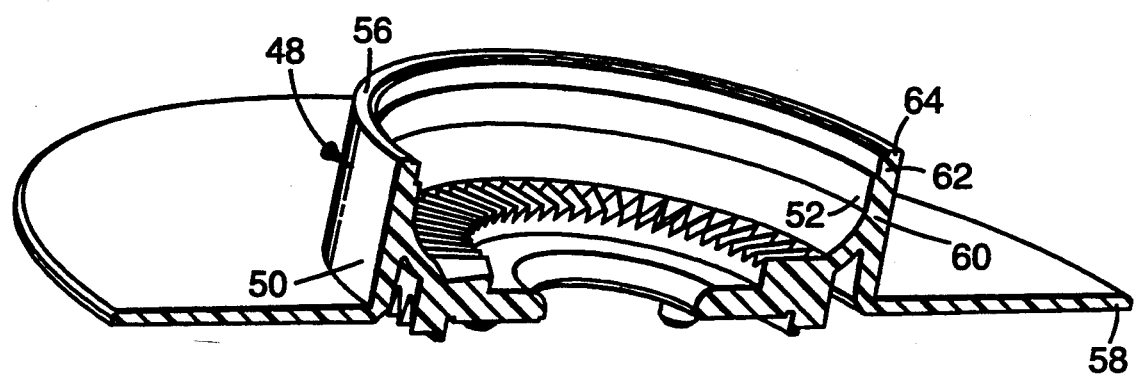
FIG. 4 is a cutaway perspective view of the hub of the reel of FIG. 1.
Figure 5:
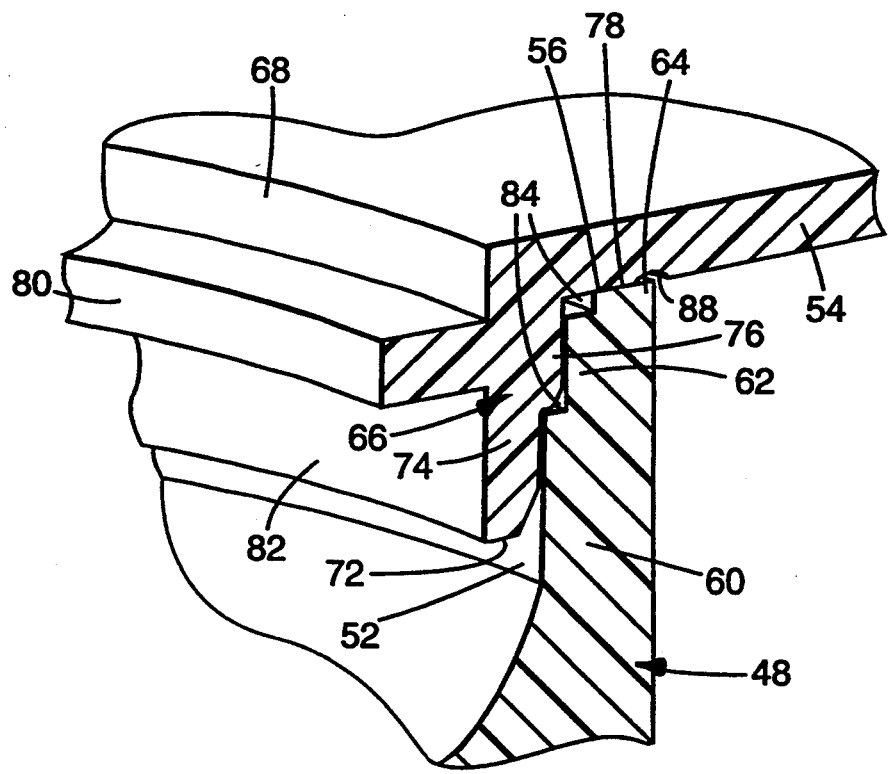
FIG. 5 is an enlarged cutaway perspective view of a the hub and flange assembly of FIG. 1 at a location without a segmented weld joint.
Figure 6:
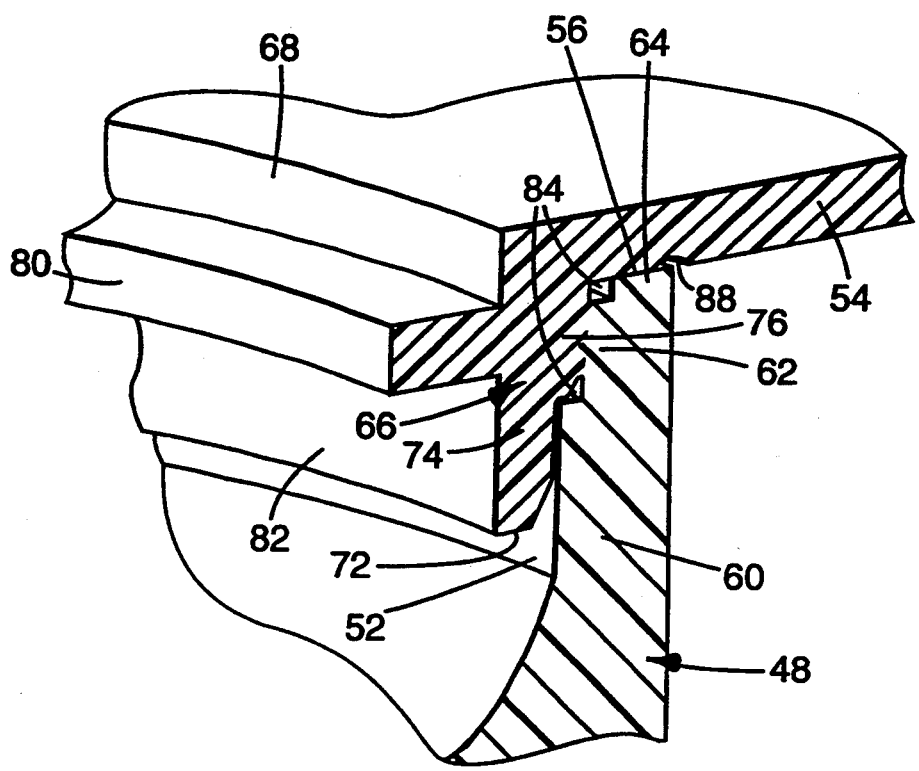
FIG. 6 is an enlarged cutaway perspective view of a the hub and flange assembly of FIG. 1 at a location with a segmented weld joint shown welded.

Referring to the hub 48 which is best shown in FIGS. 4, 5, and 6, the inner surface 52 is formed with steps such that the hub 48 steps to a decreased thickness toward the free end 56 of the hub 48. Two steps are formed on the inner surface 52 of the hub 48. These steps divide the hub 48 into a main portion 60, a flange receiving portion 62, and a flash receiving portion 64. Both the upper step and the lower step, in conjunction with the upper flange 54, form pockets 84, best shown in FIG. 5, which serve to contain flash from the welding process and prevent flash from escaping onto the tape winding surface 50 or into the cartridge where it could damage the tape.

FIGS. 3, 5, and 6 best show the upper flange 54 construction. The upper flange 54 includes a cylindrical mounting portion 66 formed on the inner opening 68 of the upper flange 54. The outer surface 70 of this mounting portion 66 is formed with a single step such that the mounting portion 66 steps to a decreased thickness toward the free end 72 of the mounting portion 66. This step divides the mounting portion 66 into a free end portion 74 and a hub receiving portion 76. The hub receiving portion 76 has an angled corner which helps form one of the pockets 84 and serves as a lead in for assembly. Alternatively, more than one step can be used.

Figure 2:
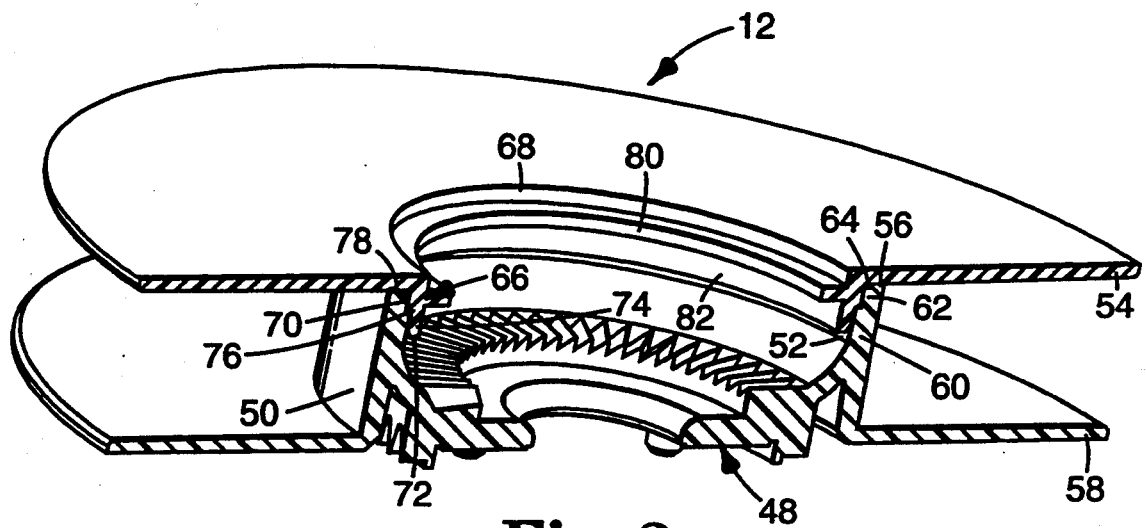
FIG. 2 is a cutaway perspective view of the hub and flange assembly of FIG. 1.

As shown in FIGS. 2, 5, and 6, the hub receiving portion 76 of the upper flange mounting portion 66 is received in the flange receiving portion 62 of the hub 48. Thus, the mounting portion 66 of the upper flange 54 and the hub 48 mesh and weld together in shear. The welding occurs into the inner surface 62 of the hub 48 of the tape reel 12, minimizing any effects on the tape winding surface 50. The shear weld process can progress until the interface 78 between the upper flange 54 and the free end 56 of the hub 48 is closed. The flash from the shear welding process is stopped and contained in the pockets 84 of the flash receiving portion 64 on the hub 48 as the interface 78 is closed. This configuration and the upper pocket 84 provide a tortuous path for the flash to travel to prevent flash from traveling outwardly and marring the appearance or the function of winding surface 50 the reel 12. This configuration and the lower pocket 84 provide a tortuous path for the flash to travel to prevent flash from traveling inwardly and affecting the interior of the cartridge 10. Also, a recess 88 is formed on the lower surface of the upper flange 54 to serve as a relief reservoir for any attached flash or ooze which is pressed out of the interface between the upper flange 54 and the hub 48 due to the imperfect contact at the interface 78 between the upper flange 54 and the free end 56 of the hub 48. The recess 88 can also prevent the formation of flash due to oscillation of the upper flange 54 against the outer corner of the hub 48.

FIG. 5 shows a gap between the surface of the hub receiving portion 76 of the upper flange 54 and the flange receiving portion 62 of the hub 48. This view shows a portion of the reel in the space between adjacent segmented weld joints 86. FIG. 6 shows the same view taken in section through a weld joint 86. Thus, there is no gap between the surface of the hub receiving portion 76 of the upper flange 54 and the flange receiving portion 62 of the hub 48. In fact, there is some overlap due to the shear weld design.

Additionally, the spacing between the lower and upper flanges 54, 58 depends on the mating of the two flat surfaces at the interface 78. These flat surfaces are not distorted during welding. Because these flat mating surfaces are molded into the parts, the spacing between the upper and lower flanges 54, 58 and the axial flange runout (wobble in the axial direction of the flanges) of the final assembly is more precisely controlled.

Thus, the present invention improves upon the known welding techniques in which a weld bead on the top of the hub never completely collapses. These known welding techniques therefore do not permit the upper flange to fully contact and rest on the hub. In the present invention, the upper flange 54 completely rests on the free end 56 of the hub 48. The free end 56 of the hub 48 serves as a locating surface for the upper flange 54.

This design and assembly technique permits the tight dimensional tolerances described below to be achieved as it is more precise than the known standard welding techniques.

An additional feature of this invention reduces hub collapse. When the tape 14 is wound onto the hub 48, the hub can collapse into a cone from the free end 56 of the hub. To reduce coning and hub collapse, a ring 80 can be formed on the inner surface 82 of the upper flange mounting portion 66, as shown in FIGS. 2, 3, and 5. This ring 80 provides extra rigidity to the assembled tape reel 12. This reduces single track errors and yields a uniform error rate, even at the ends of the tape in the first and last tracks.

The flanges 54, 58 can be tapered to provide a perpendicular distance between the flanges which increases from a minimum at the inner diameter of the flanges adjacent the hub 48 to a maximum at the outer diameter of the flanges at their edges. The taper minimizes possible interference of the tape 14 with the flanges 54, 58 by compensating for any hub wobble at the outer diameter of the tape reel 12. The nominal perpendicular distance between the flanges 54, 58 at the inner diameter is 1.290 cm (0.508 in) with a tolerance of 0.005 cm (0.002 in), providing 0.025 cm (0.010 in) of total clearance between the edge of the tape and the flanges. The nominal perpendicular distance between the flanges 54, 58 at the outer diameter is 1.326 cm (0.522) with a tolerance of 0.005 cm (0.002 in), providing 0.061 cm (0.024 in) of nominal clearance between the .edge of the tape and the flanges. The difference between these perpendicular distances is the taper and is 0.036 cm (0.014 in). A minimum of 0.018 cm (0.007 in) of taper compensates for hub wobble of 0.015 (0.006 in) at the outer diameter.

The perpendicular distance between the upper flange 54 and the lower flange 58 is greater than the nominal width of the tape 14 to be wound on the reel 12 by a nominal maximum of 4.82% and an absolute maximum (including tolerances) of 5.42%. The upper flange 54 and the lower flange 58 have an inner diameter corresponding substantially to the diameter of the hub 48 and an outer diameter greater than the inner diameter. In one embodiment, the perpendicular distance between the upper flange 54 and the lower flange 58 tapers from the inner diameter to the outer diameter by a maximum of 2.81% of the nominal width of the tape to be wound on the reel 12. This taper is half of the 5.62% of known tape reels.

The reduced taper and reduced clearances provide less room for the tape to wander along the tape winding surface 50 between the two flanges. Thus, lateral displacement of the tape during winding, known as stacking error, is reduced and improved tape windings can be achieved.

At the inner diameter, the tape can be constrained to within 0.013 cm (0.005 in) of a nominal centerline. This permits less forceful edge guiding of the tape in the tape drive apparatus. This also prevents unsupported edges of tape strands from winding out of the centerline of the tape pack as popped strands, thereby reducing creasing due to stress relaxation of the base film and preventing head-to-tape spacing and signal losses.

This reel configuration enables the use of narrower tape. A 1.257 cm (0.495 in nominal width tape could be used. When using this tape, the nominal perpendicular distance of 1.290 cm (0.508 in) between the flanges 54, 58 at the inner diameter provides 0.033 cm (0.013 in) of total clearance between the edge of the tape and the flanges. The nominal perpendicular distance of 1.326 cm (0.522 in) between the flanges 54, 58 at the outer diameter provides 0.069 cm (0.027 in) of nominal clearance between the edge of the tape and the flanges.

The perpendicular distance between the upper flange 54 and the lower flange 58 is greater than the nominal width of the tape 14 to be wound on the reel 12 by a nominal maximum of 5.45% and an absolute maximum of 6.1%. This occurs at the outer diameter of the flanges and is significantly less than the 8.80% nominal and 10.6% maximum clearance in known tape reels with known tape widths. The upper flange 54 and the lower flange 58 have an inner diameter corresponding substantially to the diameter of the hub 48 and an outer diameter greater than the inner diameter. Using the narrower tape, at the inner diameter, the tape can be constrained to within 0.016 cm (0.0065 in) of a nominal centerline.

Alternatively, the perpendicular distance between the upper flange 54 and the lower flange 58 can be a substantially constant, 1.278 cm (0.503 in). This would provide a total clearance of 0.020 cm (0.008 in) for a 1.6% increase over the nominal tape width when the narrower tape is used.

We claim:

1. A tape reel for use in a data tape cartridge insertable into a tape drive apparatus, the tape reel comprising:

an upper flange having an inner opening, wherein the upper flange comprises a cylindrical mounting portion formed on the inner opening and having a radially outer surface, wherein the mounting portion outer surface comprises a free end portion and a hub receiving portion, wherein the free end portion is located closer to a free end of the mounting portion and is thinner than the hub receiving portion;

a lower flange; and a substantially cylindrical hollow hub having a free end, wherein the upper flange is mounted on the free end of the hub and the lower flange is mounted on the other end of the hub, and wherein the hub has a substantially cylindrical tape winding surface around which tape is wound to form a tape pack having a plurality of tape strands and a radially inner surface, wherein the inner surface comprises a main portion and a flange receiving portion located closer to the free end than the main portion, wherein the flange receiving portion is thinner than the main portion, and wherein the hub receiving portion of the upper flange mounting portion is received in the flange receiving portion of the hub with a radial outer surface of the hub receiving portion contacting a radial inner surface of the flange receiving portion when the upper flange is mounted on the hub, wherein the hub inner surface further comprises a flash receiving portion located closer to the free end than the flange receiving portion, and wherein the flash receiving portion is thinner than the flange receiving portion.

2. The tape reel of claim 1 wherein when the upper flange is mounted on the hub, the upper flange and an upper flange mounting portion close the areas adjacent the flash receiving portion of the hub to contain flash from the welding process and prevent flash from escaping onto the tape winding surface.

3. The tape reel of claim 2 wherein the upper flange further comprises a recess formed on a lower surface of the upper flange.

4. The tape reel of claim 1 wherein the interface between the upper flange and the hub provides a tortuous path for the flash to travel in a direction toward the tape winding surface of the hub and in a direction away from the tape winding surface of the hub.

5. The tape reel of claim 1 wherein the upper flange is mounted to the hub using a shear weld, and wherein the hub has an inner diameter and the upper flange has an outer diameter that is less than the hub inner diameter to form an interference fit.

6. The tape reel of claim 5 wherein the upper flange comprises a weld joint which is segmented.

7. The tape reel of claim 6 wherein when the upper flange is mounted on the hub, the upper flange and an upper flange mounting portion close the areas adjacent the flash receiving portion of the hub to contain flash from the welding process and prevent flash from escaping onto the tape winding surface and the upper flange completely rests on the free end of the hub which serves as a locating surface for the upper flange and a weld area.

8. The tape reel of claim 1 wherein the lower flange and the hub are integrally formed as one piece.

9. The tape reel of claim 1 wherein the upper flange is mounted to the hub using a shear weld and wherein the upper flange further comprises a ring formed on an inner surface of the upper flange mounting portion.

10. The tape reel of claim 1 wherein the upper flange has a radially inner surface which is not contacted by any mounting aid.

11. A single reel tape cartridge comprising:
a leader block;
a length of tape connected at one end to the leader block; and
a tape reel on which the tape is wound, wherein the reel comprises:
an upper flange having an inner opening, wherein the upper flange comprises a cylindrical mounting portion formed on the inner opening and having a radially outer surface, wherein the mounting portion outer surface comprises a free end portion and a hub receiving portion, wherein the free end portion is located closer to a free end of the mounting portion and is thinner than the hub receiving portion;
a lower flange; and
a substantially cylindrical hollow hub having a free end, wherein the upper flange is mounted on the free end of the hub and the lower flange is mounted on the other end of the hub, and wherein the hub has a substantially cylindrical tape winding surface around which tape is wound to form a tape pack having a plurality of tape strands and a radially inner surface, wherein the inner surface comprises a main portion and a flange receiving portion located closer to the free end than the main portion, wherein the flange receiving portion is thinner than the main portion, and wherein the hub receiving portion of the upper flange mounting portion is received in the flange receiving portion of the hub with a radial outer surface of the hub receiving portion contacting a radial inner surface of the flange receiving portion when the upper flange is mounted on the hub, wherein the hub inner surface further comprises a flash receiving portion located closer to the free end than the flange receiving portion, wherein the flash receiving portion is thinner than the flange receiving portion.

12. The tape cartridge of claim 11 wherein when the upper flange is mounted on the hub, the upper flange and an upper flange mounting portion close the areas adjacent to the flash receiving portion of the hub to contain flash from the welding process and prevent flash from escaping onto the tape winding surface.

13. The tape cartridge of claim 11 wherein the interface between the upper flange and the hub provides a tortuous path for the flash to travel.

14. The tape cartridge of claim 11 wherein the upper flange is mounted to the hub using a shear weld.

15. The tape cartridge of claim 11 wherein the lower flange and the hub are integrally formed as one piece.

16. The tape cartridge of claim 11 wherein the upper flange further comprises a ring formed on the inner surface of the upper flange mounting portion, wherein the ring increases the rigidity of the assembled reel and reduces hub collapse.

17. A tape reel for use in a data tape cartridge insertable into a tape drive apparatus, the tape reel comprising:
an upper flange having an inner opening, wherein the upper flange comprises a cylindrical mounting portion formed on the inner opening and having a radially outer surface, wherein the mounting portion outer surface comprises a free end portion and a hub receiving portion, wherein the free end portion is located closer to the free end of the mounting portion and is thinner than the hub receiving portion;
a lower flange; and
a substantially cylindrical hollow hub having a free end, wherein the upper flange is mounted on the free end of the hub using a sonic, shear weld, and the lower flange is mounted on the other end of the hub, and wherein the hub has a substantially cylindrical tape winding surface around which tape is wound to form a tape pack having a plurality of tape strands and inner surface, wherein the inner surface comprises a main portion and a flange receiving portion located closer to the free end than the main portion, wherein the flange receiving portion is thinner than the main portion, wherein the hub receiving portion of the upper flange mounting portion is received in the flange receiving portion of the hub with a radial outer surface of the hub receiving portion contacting a radial inner surface of the flange receiving portion when the upper flange is mounted on the hub, and wherein the hub inner surface further comprises a flash receiving portion located closer to the free end than the flange receiving portion, and wherein the flash receiving portion is thinner than the flange receiving portion.

* * * * *